United States Patent [19]

Peters

[11] Patent Number: 5,884,005
[45] Date of Patent: *Mar. 16, 1999

[54] SYSTEM FOR RECORDING AND DISPLAYING IMAGES ON A RECORD CARRIER IN AT LEAST A FIRST AND A SECOND DATA STREAM

[75] Inventor: Joseph H. Peters, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 518,063

[22] Filed: Aug. 22, 1995

[30] Foreign Application Priority Data

Aug. 22, 1994 [EP] European Pat. Off. .............. 94202386

[51] Int. Cl.$^6$ .......................... H04N 5/917; H04N 5/225
[52] U.S. Cl. ........................................ 386/109; 386/120
[58] Field of Search ............................ 386/46, 92, 109, 386/112, 117, 120, 122, 125, 126; 360/32, 33.1; H04N 5/917, 5/225

[56] References Cited

U.S. PATENT DOCUMENTS

| | | | |
|---|---|---|---|
| 4,602,333 | 7/1986 | Komori | 364/414 |
| 5,270,831 | 12/1993 | Parulski et al. | 395/102 |
| 5,377,051 | 12/1994 | Lane et al. | 360/33.1 |

FOREIGN PATENT DOCUMENTS

| | | |
|---|---|---|
| 0405491 | 1/1991 | European Pat. Off. . |
| 0649254 | 4/1995 | European Pat. Off. . |

OTHER PUBLICATIONS

"Method of Storing in Coded Form Image Information of Moving Images, Diagnostic System Using the Method, and Image Coding and Recording Unit . . . " by Joseph Peters et al, U.S. Serial No. 08/294,129, filed Aug. 22, 1994.

*Primary Examiner*—Robert Chevalier
*Attorney, Agent, or Firm*—Dwight H. Renfrew, Jr.

[57] ABSTRACT

In a system for recording and displaying still and moving images, the still images are recorded on a record carrier (8) in a loss-free manner and with a low compression factor, whereas the moving images are recorded with a high compression factor and an algorithm which is not loss-free. For medical images, for example cardiac images, processing of the images prior to display is desirable. For the moving images the image processing (5) is performed prior to compression (4) and recording (7). For the still images the processing (19) is performed after the images have been read from a record carrier (8) and reconstructed. A raw version of the loss-free still images thus remains available for analysis (20).

19 Claims, 2 Drawing Sheets

SYSTEM FOR RECORDING AND DISPLAYING IMAGES ON A RECORD CARRIER IN AT LEAST A FIRST AND A SECOND DATA STREAM

BACKGROUND OF THE INVENTION

1. Field of the Invention

The invention relates to a system for recording and displaying a series of images on a record carrier, which system includes an image encoding and recording unit for recording images in at least a first and a second data stream, and an image information retrieval unit for displaying images stored on the record carrier, which image information retrieval unit has a first and a second mode of operation, in the first mode of operation images originating from the first data stream being displayed whereas in the second mode of operation images from the second data stream are displayed. The invention also relates to an image encoding and recording unit and an image information retrieval unit for use in such a system.

2. Description of the Related Art

A system of this kind is described in the previous European Patent Application No. 94202922.4 (which corresponds to U.S. patent application Ser. No. 08/294,129, filed Aug. 22, 1994 and can be used, for example in medical diagnostic applications for storing X-ray images in digital form. The diagnostic X-ray images can be displayed in various ways, for example with a high and with a low resolution, as stationary images or as moving images. As is described in the cited previous Application, the requirements imposed on the various display methods, in conjunction with the technical limitations of the recording and retrieval units, are optimally satisfied by recording the images on the record carrier in different data streams and by using a different data stream for display in conformity with the desired display method.

In practice the recorded "raw" X-ray images are subjected to various image processing operations before they are displayed. An important reason for image processing is the elimination or reduction of image artefacts introduced by the recording equipment, for example distortions or vignetting introduced by the optical system and elements which are visible in the image, for example the scatter radiation grid or the lead shutters of the collimator. Other reasons are the elimination of overexposed or uninteresting but disturbing parts of the image from the image displayed, the adaptation of the contrast in a diagnostically interesting part of the image, and the enhancement of the image.

When image processing is performed in the image encoding and recording unit, processed images are recorded and analysis techniques can no longer be applied to the "raw" images. Such analysis techniques are diagnostically important, because they enable determination of important parameters, for example the volume of the left ventricle in the case of cardiography. The application of analysis techniques to processed images has the serious drawback that the result is rendered dependent on the image processing algorithm used. A second drawback resides in the fact that image processing modifies the image, such as increased image sharpness and hence also increased noise, so that loss-free compression with an acceptable compression factor becomes impossible. Image compression is often necessary because of the large number of images involved in, for example cardiography, the finite storage capacity of the record carrier, and the limited speed of data transport to and from the record carrier.

Image processing in the image information retrieval unit is disadvantageous when a large number of images must be displayed within a short period of time, for example display of moving images in the form of a film. These moving images necessitate the use of a data stream with high compression so that, in combination with enhancement or increased contrast during the image processing, disturbing image artefacts are liable to occur.

SUMMARY OF THE INVENTION

It is inter alia an object of the invention to provide a system in which said image processing drawbacks are mitigated.

To achieve this, a system of the kind set forth in accordance with the invention comprises an image encoding and recording unit which is arranged to perform image processing on the images to be recorded in the first data stream and an image information retrieval unit which is arranged to perform image processing on the images to be displayed in the second data stream. Because the images in the first data stream are compressed and recorded after image processing, undesirable accumulation of the effects of the two operations does not occur. The "raw" images are contained in or can be reconstructed from the images of the second data stream and the data in this second data stream thus serve as a basis for analytical techniques. Loss-free compression with an acceptable compression factor for the second data stream can thus be combined with non-loss-free compression of processed images in the first data stream.

Preferably, the first data stream is used for moving images and the second data stream for stationary images.

In a preferred embodiment of the system in accordance with the invention, said image processing in the image encoding and recording unit and in the image information retrieval unit consists of the same image processing operations. Thus, the user will not observe any difference in processing, the "raw" images nevertheless being available for analysis. Comparatively small processing operations whereby the images are adapted to the user's personal preferences can be performed as yet on images of the first and the second data stream in the image information retrieval unit.

The image information retrieval unit in a further embodiment of the invention may be provided with an analysis module for analyzing images from the second data stream by means of automatic or semi-automatic analysis techniques. In the case of a semi-automatic technique, the user indicates, by way of interaction with, for example a display screen and a light pen or other pointing means, which specific points in the image are of particular interest. In the case of an automatic technique, an analysis method is executed without directives from the user. In addition to an integrated analysis module, the image information retrieval unit may also comprise an interface to a computer for performing an analysis.

A particularly economical embodiment of the invention can be razed when the image information retrieval unit is arranged only to display images from the first data stream stored on the recorded carrier and to analyze recorded image information from the second data stream by means of automatic or semi-automatic analysis techniques. As a result of the omission of the display of images from the second data stream, the use of a simpler and hence less expensive image information retrieval unit suffices. The second data stream, in which no information has been lost by image compression, however, remains available so as to carry out quantitative or analytical measurements on the images. In this embodiment it is accepted that the images displayed may be of lower quality.

BRIEF DESCRIPTION OF THE DRAWING

The invention will be described in detail hereinafter, by way of example, wherein.

DETAILED DESCRIPTION OF THE PREFERRED EMBODIMENTS

Figure 1:
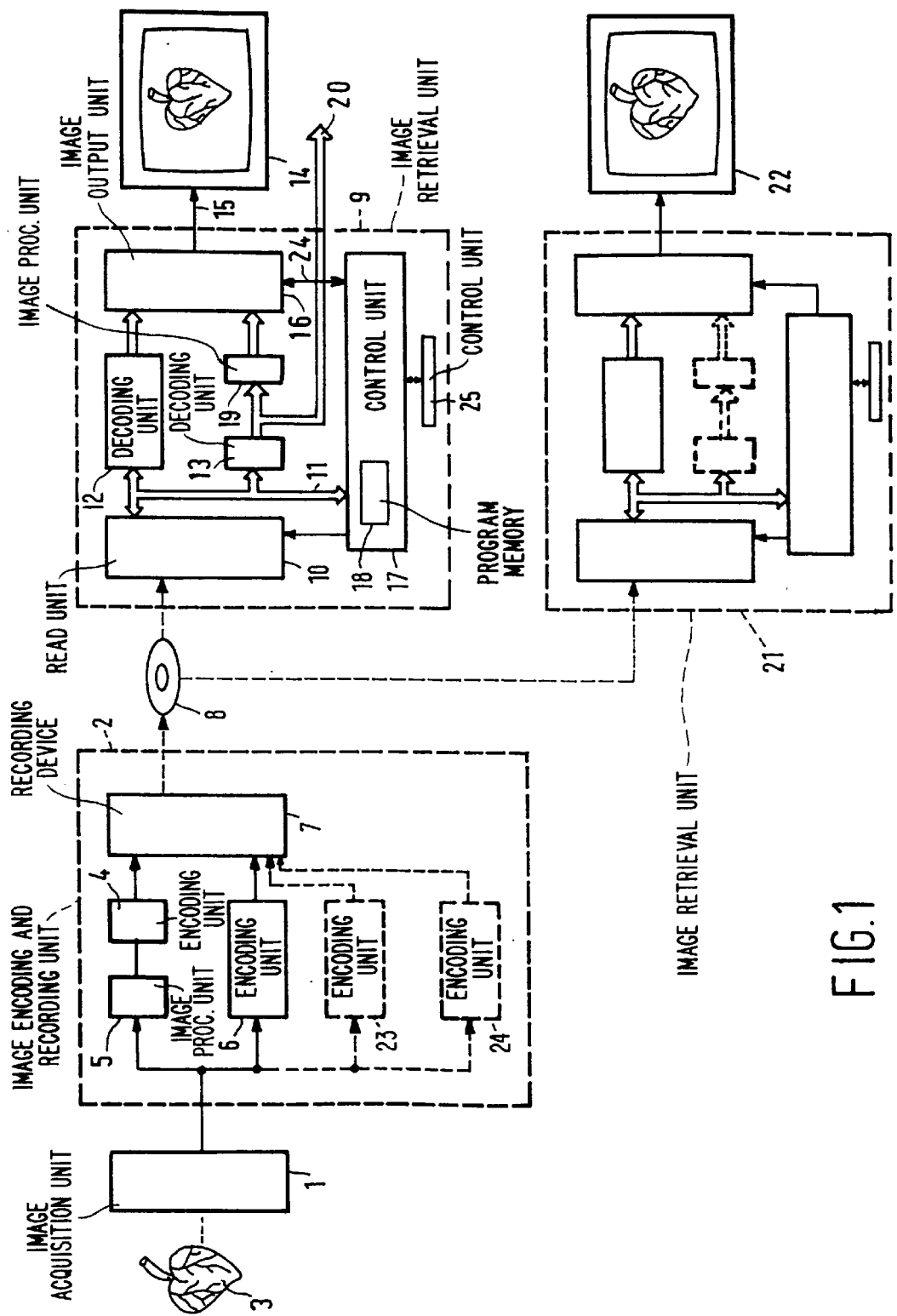
FIG. 1 shows diagrammatically a system in accordance with the invention.

FIG. 1 shows an embodiment of a system in accordance with the invention which is based on a system as described in the cited previous European Patent Application No. 94202922.4 for the recording and display of series of images. The cited U.S. Patent Application corresponding thereto is considered to be incorporated herein by way of reference. The system comprises customary means 1 for acquiring moving-image information relating to an object 3 to be examined. Such means 1, referred to hereinafter as an image acquisition unit, may comprise customary X-ray imaging equipment for forming a series of X-ray images of the vascular system of a human or animal heart into which a contrast medium has been introduced, which images succeed one another with fixed time intervals of, for example 40 ms. The X-ray image is converted into an electronic signal, for example by way of an image intensifier/TV chain or directly via a semiconductor X-ray detector. Image signals representing the acquired series of images are applied to an image encoding and recording unit 2. In the case of so-called cine X-ray images, the image signals may consist of digital signals representing monochrome images formed by a matrix of, for example 512×512 pixels, the image signal indicating a brightness value for each pixel.

The image encoding and recording unit 2 comprises a first encoding unit 4 and a second encoding unit 6 for converting the series of images, represented by the image signals, into a first and a second data stream. Each image of the series is represented in both data streams. The encoding unit 4 for the first data stream is of a customary type for the compression of moving images. An important requirement imposed on such compression techniques is that on average a small quantity of information is to be recorded per image, so that the amount of information to be transmitted per unit of time, and consequently the required transmission bandwidth, can be kept small. The image quality of the individual images is less important, because faults in the moving images are less conspicuous than in a stationary image. Therefore, it is acceptable to use a compression technique which is not loss-free, i.e. the image retrieved after decompression is not identical to the original image, but constitutes an approximation thereof. When a lossy compression technique is used, the compression factor may be much higher and hence the quantity of information to be recorded may be small.

The second encoding unit 6 supplies the second data stream. In this second data stream a high-quality stationary image can be retrieved for each image of the series. An important requirement to be met in this respect is that the image retrieved is identical, or substantially identical, to the original image. To this end, the encoding unit 6 is of a customary type optimized for the encoding of stationary images and a loss-free compression technique with a small compression factor is utilized, or compression is even omitted. Because no special requirements need be imposed as regards the speed at which the encoded image is transferred, the quantity of information per encoded image is not very important.

The units 23 and 24 are optional encoding units for third and fourth data streams, respectively. The image encoding and recording unit 2 also comprises a recording device 7 for recording the first and second data streams (and third and fourth data streams if provided) on one and the same record carrier 8. For reasons of storage capacity and the feasible short access times due to random access, a disc-like optical or magneto-optical record carrier is to be preferred. The record carrier 8 is, for example a separate carrier which can be simply removed from the recording device, after recording, in order to be used or stored elsewhere. However, the record carrier may also be a permanently installed storage system, for example consisting of an electronic archiving system with high-capacity magnetic or optical discs. Such systems are known as Picture Archiving and Communication Systems (PACS).

The system also comprises an image information retrieval unit 9. This unit comprises a read unit 10 for reading the record carrier 8 at a speed which is sufficiently high to achieve a smooth display of the moving-image information. The read unit 10 is coupled, via a bus 11, to a first decoding unit 12 and a second decoding unit 13 in order to apply the first and second data streams read to the first and the second decoding unit, respectively. Each of the decoding units 12 and 13 is of a customary type for the retrieval of the moving-image information and the stationary-image information, respectively, in the first and second data streams. The image information retrieval unit 9 also comprises an image output unit 16 of a customary type which is arranged to convert the retrieved images into an output signal which can be displayed on an image display unit 14, for example a monitor or a television apparatus. The image information retrieval unit 9 furthermore comprises a control unit 17 which is coupled to the read unit 10, the first and the second decoding unit 12, 13, and the image output unit 16. Via the control unit 17, the image information retrieval unit can operate in a first and a second mode of operation. In the first mode of operation, under the control of a program in a program memory 18 a selected part of the recorded first data stream is read, the moving-image information thereof is retrieved, and the retrieved moving-image information is output. Likewise under the control of a program, in the second mode of operation a selected encoded image is read from the second data stream so as to be decoded and output. Selection of the first or the second mode of operation can be realized via a control unit 25.

In addition to the first and second data streams for high-quality image information, a third and possibly a fourth data stream of low quality can also be recorded on the record carrier. This may be advantageous for situations in which high-quality display of the images is not required. The reading and display of the image information in the third and fourth data streams can then be executed by means of an image information retrieval unit 21 which is less expensive than the image information retrieval unit 9 and coupled to an image display unit 22. Such an image information retrieval unit for low quality may be, for example a CD-i player or a personal computer comprising a CD-ROM unit.

In order to enable image processing of the images in the first as well as in the second data stream without degrading the image quality of the moving images in the first data stream, the image encoding and recording unit 2 comprises an image processing unit 5 which is arranged ahead of the first encoding unit 4. It processes only the moving-image information in the first data stream and records it as such on the record carrier. The second data stream, being encoded and recorded by the second encoding unit 6, is not subject to processing in the image encoding and recording unit 2. Image processing of this second data stream takes place in the image information retrieval unit 9, after decoding in the second decoding unit 13 in an image processing unit 19. The decoding unit 13 also comprises an output 20 via which the "raw" images can be applied to an analysis module or computer.

Figure 2:
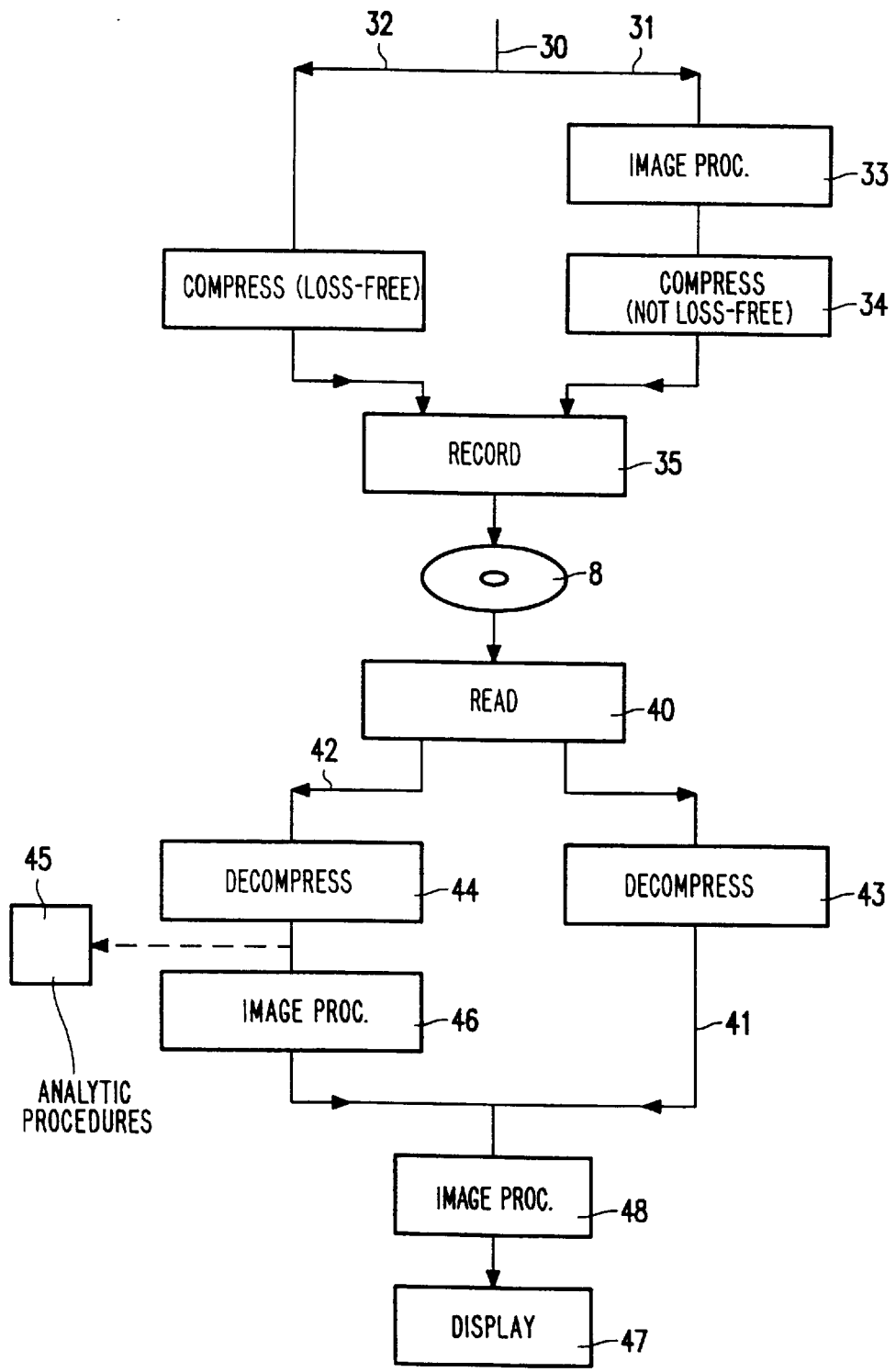
FIG. 2 shows diagram illustrating the operations performed in the system in accordance with the invention.

The image processing is illustrated in more detail in FIG. 2. The original "raw" image information 30 follows two parallel channels 31 and 32 in the image encoding and recording device. In the first channel 31 for moving-image information every incoming image is processed by means of an image processing algorithm 33, for example unsharp masking. Other feasible operations are the identification or removal of artefacts or visible parts of the recording equipment. Subsequently, the quantity of data is strongly reduced by way of a compression algorithm 34. As a result of the use of a compression algorithm which is not loss-free, (i.e. lossy) for example a compression factor 6 can be used. In the second channel 32, intended for stationary-image information, no image processing takes place and a loss-free compression is carried out with a much smaller compression factor, for example approximately 2. Subsequently, both data streams are recorded on the record carrier 8 (35).

In the image information retrieval unit the two data streams follow two channels 41 and 42, respectively, after reading (40). In the first channel 41 only a decompression 43 takes place of the processed first data stream, compressed in a non-loss-free manner and containing the moving-image information. This data stream is used only for displaying (47) moving images. In the second channel 42 first the stationary-image information, compressed in a loss-free manner, is decompressed. The decompression (44) results in a reconstruction of the original "raw" images. These images can serve as a basis for analytical techniques 45 whereby diagnostically relevant parameters can be measured or elements visible in the image can be identified, for example the volume of the left ventricle or the presence of stenosis.

Furthermore, for the display of the stationary-image information an image processing algorithm (46) is also applied to the decompressed images. Like the moving images, the stationary images are then displayed (47). When the same image processing algorithm is used for the images in the first and the second data stream, the algorithm being applied to the "raw" images in both cases, the user cannot observe any difference.

If desired, a minor additional image processing operation (48) can be carried out on the moving as well as the stationary images in order to display the images in conformity with the user's personal preferences.

The display of the images from the second data stream can be dispensed within an economical embodiment. Stationary images are then derived from the first data stream which has been compressed in a manner which is not less-free. In such an inexpensive image information retrieval unit information is not transferred between the decompression (44) and the display of the images (47). The image processing algorithm (46) is also absent. The result of a decompression (44), if any, of the second data stream is used exclusively for analytical techniques (45). The image processing unit 19 is then absent in the diagram shown in FIG. 1.

I claim:

1. A system for recording and displaying a series of images on a record carrier, which system comprises an image encoding and recording unit for recording each of the images in the series in at least both a first and a second data stream on the record carrier, and an image information retrieval unit for displaying images recorded on the record carrier, which image information retrieval unit has a first mode of operation in which images recorded in the first data stream are displayed and a second mode of operation in which images recorded in the second data stream are displayed, the image encoding and recording unit being arranged to perform on the images to be recorded in the first data stream image processing to form an image processed image followed by lossy compression of the image processed image, and the image information retrieval unit being arranged to perform image processing by an image processing algorithm on the images to be displayed which are retrieved from the second data stream.

2. A system as claimed in claim 1, wherein the images in the second data stream are recorded in a non-compressed or in a loss-free compressed form.

3. A system as claimed in claim 1, wherein in the first mode of operation of the image information retrieval unit moving images are displayed whereas in the second mode of operation images are displayed stationary.

4. A system as claimed in claim 1, wherein said image processing in the image encoding and recording unit and in the image information retrieval unit comprises the same image processing operations.

5. A system as claimed in claim 1, wherein the record carrier is a writable optical disc.

6. An image information retrieval unit for displaying images from a series of images in which each of the images in the series is recorded on a record carrier in at least both a first and a second data stream, the images in the first data stream having been subjected to an image processing and then recorded in a lossy compressed form and the images in the second data stream being recorded in a non-compressed or in a loss-free compressed form, which image information retrieval unit has a first mode of operation for displaying images originating from the first data stream and a second mode of operation for displaying images from the second data stream, and is also arranged to perform decompression but no image processing on the images to be displayed which are retrieved from the first data stream and to perform an image processing on the images to be displayed which are retrieved from the second data stream.

7. An image information retrieval unit as claimed in claim 6, wherein in the first mode of operation of the image information retrieval unit moving images are displayed and in the second mode of operation images are displayed stationary.

8. An image information retrieval unit as claimed in claim 6, wherein the image information retrieval unit is also arranged to analyze images from the second data stream by means of automatic or semi-automatic analysis techniques.

9. A system for recording and displaying a series of images on a record carrier, which system comprises an image encoding and recording unit for recording each of the images in the series in at least both a first and a second data stream and is arranged to perform image processing on the images to be recorded in the first data stream to form image processed images followed by lossy compression of the image processed images, which system also comprises an image information retrieval unit for which is arranged to decompress images from the first data stream on the record carrier, and is also arranged to analyze recorded image information from the second data stream on the record carrier by means of automatic or semi-automatic analysis techniques in order to produce parameters describing elements in the image.

10. An image information retrieval unit for displaying images from a series of images in which each of the images of the series is recorded on a record carrier in at least both a first and a second data stream, the images in the first data stream having been subjected to an image processing and then recorded in a lossy compressed form and the images in the second data stream being recorded in a non-compressed or in a loss-free compressed form, which image information retrieval unit is arranged to decompress images retrieved from the first data stream on the record carrier and is also arranged to analyze images retrieved from the second data stream on the record carrier by means of automatic or semi-automatic analysis techniques, but not to analyze images retrieved from the first data stream.

11. A system as claimed in claim 2, wherein in the first mode of operation of the image information retrieval unit moving images are displayed whereas in the second mode of operation images are displayed stationary.

12. A system as claimed in claim 2, wherein said image processing in the image encoding and recording unit and in the image information retrieval unit comprises the same image processing operations.

13. A system as claimed in claim 3, wherein said image processing in the image encoding and recording unit and in the image information retrieval unit comprises the same image processing operations.

14. A system as claimed in claim 11, wherein said image processing in the image encoding and recording unit and in the image information retrieval unit comprises the same image processing operations.

15. A system as claimed in claim 2, wherein the record carrier is a writable optical disc.

16. A system as claimed in claim 3, wherein the record carrier is a writable optical disc.

17. A system as claimed in claim 4, wherein the record carrier is a writable optical disc.

18. A system as claimed in claim 14, wherein the record carrier is a writable optical disc.

19. An image information retrieval unit as claimed in claim 7, wherein the image information retrieval unit is also arranged to analyze images from the second data stream by means of automatic or semi-automatic analysis techniques.

* * * * *